Feb. 12, 1929. 1,702,089

E. J. ROHNE

ELECTRICAL HEATING UTENSIL

Filed June 21, 1926    2 Sheets-Sheet 1

Inventor
Even J. Rohne
By his Attorneys

Feb. 12, 1929.
E. J. ROHNE
1,702,089
ELECTRICAL HEATING UTENSIL
Filed June 21, 1926    2 Sheets-Sheet 2
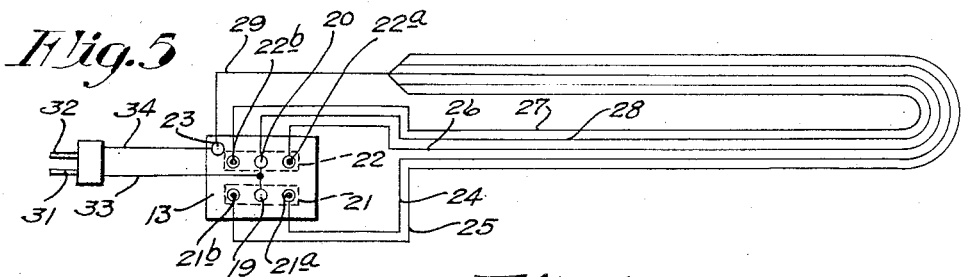
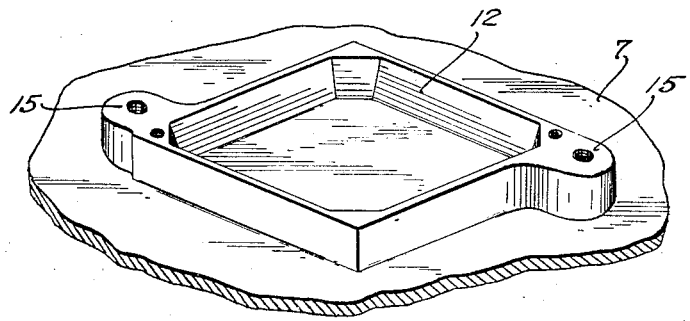
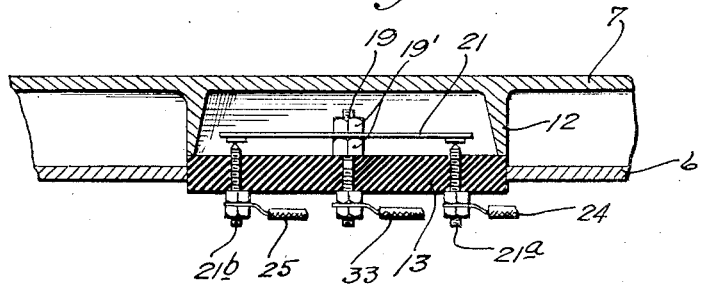
Inventor
Even J. Rohne
By his Attorneys Patented Feb. 12, 1929.

1,702,089

UNITED STATES PATENT OFFICE.

EVAN J. ROHNE, OF MINNEAPOLIS, MINNESOTA.

ELECTRICAL HEATING UTENSIL.

Application filed June 21, 1926. Serial No. 117,378.

My present invention provides an improved electrical heating utensil adapted for many different uses but especially adapted for use in cooking vegetables, meats and other edibles, or for boiling or heating liquids; and, generally stated, the invention consists of the novel devices, combinations of devices, and arrangement of parts hereinafter described and defined in the claims.

The improvement is directed particularly to an improved structure or arrangement which renders assembling of the various elements of the device an easy matter, and access to the various electrical connections convenient.

In the accompanying drawings, which illustrate the invention, like characters indicate like parts throughout the several views.

Referring to the drawings:

Fig. 3 is an enlarged fragmentary section taken on the line 3—3 of Fig. 1;

Fig. 4 is a fragmentary view showing a portion of the bottom of the inner pot, the same being turned upside down; and Fig. 5 is a diagrammatic view illustrating the heating circuits.

Figure 2:
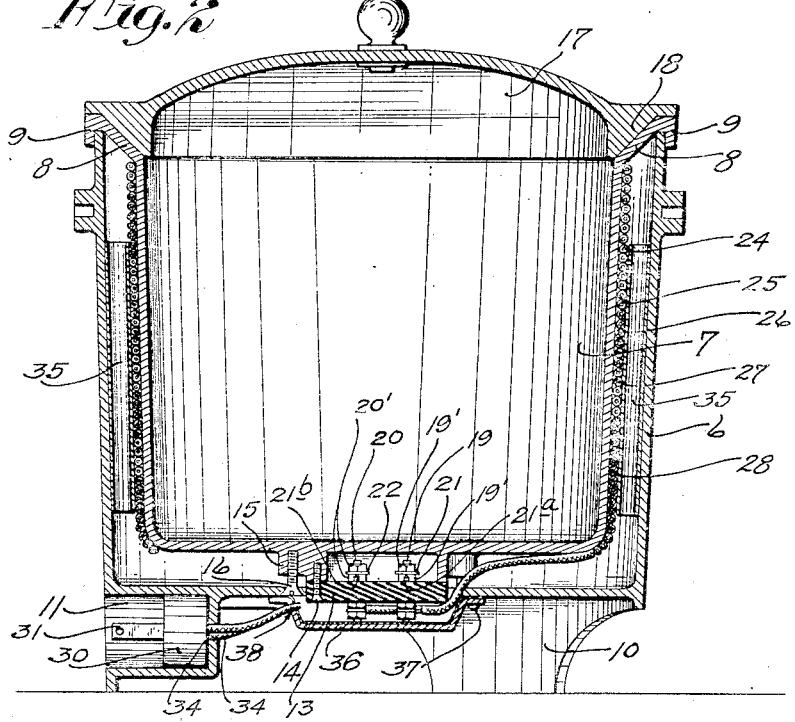
Fig. 2 is a vertical section taken on the line 2—2 of Fig. 1.
Figure 1:
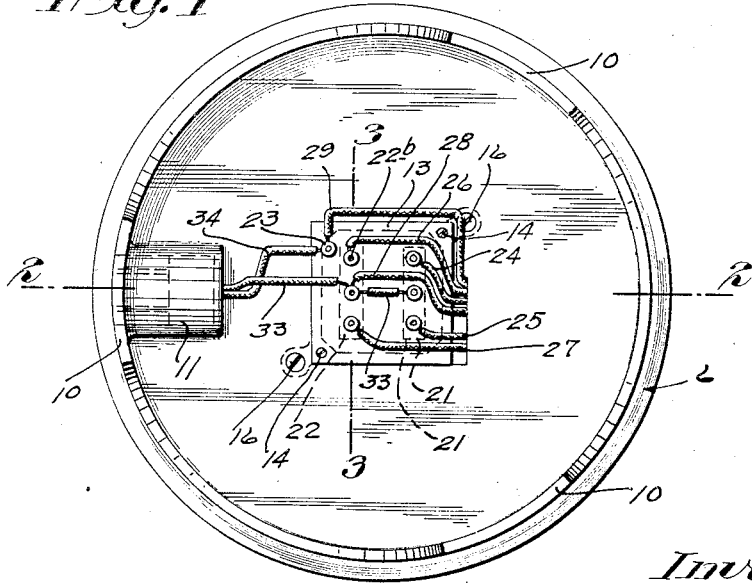
Fig. 1 is a bottom plan view of the heating utensil.

The heater comprises two main elements, to wit: an outer shell 6 and an inner shell or pot 7, the latter of which is spaced within the former and is provided with a flaring lid seat 8 terminated in a downturned annular flange 9 that telescopes tightly over the upper edge of the outer shell 6. Both of the shells 6 and 7 are preferably round in horizontal section. The inner shell of the pot 7 is spaced from the bottom of the outer shell 6 and said outer shell is formed with depending leg-forming flanges 10 and at one side with a radially extended cylindrical plug-holding seat 11.

On the bottom of the pot 7, preferably cast integral therewith, is a terminal block seating flange 12, preferably of rectangular outline, so as to form a bearing surface for a rectangular terminal block 13 of insulating material, such as vulcanized wood fibre, gutta percha or the like. This terminal block 13 is rigidly but detachably secured to obliquely opposite corners of the flange 12 by screws 14 and these same corners of said flange are shown as extended to form lugs 15 provided with internally threaded seats. By means of screws 16 passed through perforations in the bottom of the outer shell 6 and screwed into the seats of the lugs 15, the two shells 6 and 7 are rigidly connected and the flanged upper edge of the latter is tightly drawn onto the upper edge of the former. The bottom of the outer shell 6 is provided with a recess through which the terminal block 13 is freely passed so that the lower surface of said block is accessible when the two shells are rigidly connected.

The inner shell or pot 7 is provided with a detachable lid or cover 17 formed with a conical flange 18 that closely fits the lid seat 8 of the pot 7 and thereby tightly closes said pot against the escape of steam under a pressure less than that required to lift the lid.

Applied directly around the pot is an electrical heater made up of a plurality of coils having their terminals anchored to suitable binding posts applied on the terminal block 13. Instead of using a single coil for a heating element, I preferably employ a multiplicity of coils connected in parallel and thermostatically controlled on a plan disclosed and broadly claimed in my prior Patent #1,453,889, of date May 1, 1923, and entitled "Tire vulcanizer". Hence, for the purposes of this case, the wiring system disclosed, but which may be varied, is as follows.

Mounted on and extended through the central portion of the terminal block 13 are terminal screws 19 and 20. By means of nuts 19' and 20' on the upper ends of the screws 19 and 20, thermostat bars 21 and 22, respectively, are secured. These thermostat bars 21 are of a well known laminated type, which, under increasing temperature, will assume curved form, causing the ends to rise. Normally, or at low temperatures, the ends of the bars 21 engage the points of contact screws 21$^a$ and 21$^b$, which, as shown, have threaded engagement with and extend through the terminal block 13. In a similar manner, the ends of the bar 22, normally or under low temperatures, engage with the points of contact screws 22$^a$ and 22$^b$ that also extend through and have threaded engagement with the terminal block 13. Mounted on and extended through the terminal block 13 is an additional terminal screw 23. From the terminal screws or contacts 21$^a$, 21$^b$, 22$^a$, 22$^b$, and 20, wires 24, 25, 26, 27 and 28, respectively, are extended and at their extended ends, these several wires are, by a common wire 29, connected to the screw 23. The several wires 24, 25, 26, 27 and 28 are extended and wound around the pot 7 to form the heating coil. Preferably, the several wires, as best shown in Fig. 2, are insulated. A compartment is formed at the bottom of the bowl 7 by the flange 12 that is normally completely and tightly closed by the terminal block 13 and within this compartment the thermostat bars 21 and 22 are held by said block where they are protected from dirt and dust and also kept from the air to prevent rust and corrosion.

Seated in the plug seat 11 is a contact plug 30 having the customary extended contact prongs 31 and 32. By a wire 33, the contact prong 31 is connected to terminal screws 19 and 20, and by a wire 34, the contact prong 32 is connected to the screw 23. The contact screws 21$^a$, 21$^b$, 22$^a$ and 22$^b$ are so adjusted that the thermostat bars 21 will progressively open and close the various branch circuits connected thereto, but an electrical circuit for low temperatures will always be maintained through the wires 34, 29, 28 and 33. Of course, the current for supplying the heat will be applied by inserting a contact socket into the seat 11 and onto the contact prongs 31 and 32.

From what has been said, it will be understood that so far as the present invention is concerned, the electrical heating element may take various different forms.

It will be noted that the seating flange 12 forms a recess affording clearance for the upper ends of the terminal screws, the nuts applied thereto and the thermostat bars 21 and 22. The three main elements 6, 7 and 17 of the heating utensil are preferably castings of suitable metal, such as iron or aluminum. The numeral 35 indicates insulating material placed within the outer shell 6 and surrounding the coils of the heating element.

The device so far described is complete, but in the drawings, I have illustrated a pan-shaped guard plate or false bottom 36 applied to the bottom of the outer shell 6 under a terminal block 13. This guard plate 36 has an outturned flange adapted to be detachably secured to the bottom of the shell 6 by screws 37, and at one side, it is formed with a notch 38 to clear the wires 33 and 34, as best shown in Fig. 2. It is evident that the terminal block may be applied to the bottom of the pot 7 and its connections to all of the wires of the heating element may be made before the pot is inserted within the outer shell, and that, after the pot has been applied within the casing and secured by the screws 16, all that is necessary to complete the electrical connections is to connect the wires 33 and 34 to the screws 20 and 23. If the two shells of the heater are to be separated, it is only necessary to disconnect the two wires 33 and 34, and this being done, the pot may be removed without disturbing any of the electrical connections applied thereto.

What I claim is:

A heating utensil comprising an outer shell, a bowl applied within the outer shell and having in its bottom a depending endless terminal-block-seating flange and a compartment within said flange, said outer shell having in its bottom an aperture coincident with the compartment, a heating element for the bowl, an insulating terminal block fitting in said aperture, seated on said flange and detachably held thereon, said terminal block normally closing the aperture in the outer shell and completely closing said compartment, and a thermostat in the electric circuit for the heating element mounted on the terminal block and held thereby within said compartment.

In testimony whereof I affix my signature.

EVEN J. ROHNE.